United States Patent
Fujikawa

(10) Patent No.: US 8,107,919 B2
(45) Date of Patent: Jan. 31, 2012

(54) RF RECEIVER

(75) Inventor: Kazuhiko Fujikawa, Fukui (JP)

(73) Assignee: Panasonic Corporation, Osaka (JP)

( * ) Notice: Subject to any disclaimer, the term of this patent is extended or adjusted under 35 U.S.C. 154(b) by 323 days.

(21) Appl. No.: 12/500,960

(22) Filed: Jul. 10, 2009

(65) Prior Publication Data

US 2010/0015938 A1 Jan. 21, 2010

(30) Foreign Application Priority Data

Jul. 17, 2008 (JP) .................. 2008-185559

(51) Int. Cl.
*H04B 1/26* (2006.01)

(52) U.S. Cl. ............... 455/318; 455/345; 331/60

(58) Field of Classification Search .......... 455/208, 455/236.1, 255, 258, 259, 264, 318, 152.1, 455/297, 345; 331/10, 60
See application file for complete search history.

(56) References Cited

U.S. PATENT DOCUMENTS

| | | | |
|---|---|---|---|
| 7,088,218 B2* | 8/2006 | Chuey ................ | 340/5.23 |
| 7,215,937 B2 | 5/2007 | Someya | |
| 7,587,188 B2 | 9/2009 | Someya | |
| 7,613,441 B2 | 11/2009 | Someya | |
| 7,650,128 B2 | 1/2010 | Someya | |
| 7,809,341 B2 | 10/2010 | Someya | |
| 7,835,714 B2 | 11/2010 | Someya | |
| 2001/0043109 A1* | 11/2001 | Masumoto et al. ........... 327/356 |
| 2006/0164210 A1* | 7/2006 | Ikeo ............................. 340/5.72 |
| 2007/0021082 A1* | 1/2007 | Okumura et al. ............. 455/142 |
| 2008/0254755 A1* | 10/2008 | Kato ............................. 455/118 |

FOREIGN PATENT DOCUMENTS

| | | |
|---|---|---|
| CN | 1726639 A | 1/2006 |
| CN | 200910157548.6 | 12/2010 |
| JP | 2002-218573 A | 8/2002 |

* cited by examiner

*Primary Examiner* — Christian Hannon
(74) *Attorney, Agent, or Firm* — RatnerPrestia

(57) ABSTRACT

A radio frequency (RF) receiver includes an oscillator for outputting an oscillation signal from an output port thereof, a limiter for dividing the oscillation signal output from the oscillator into a branch signal at a predetermined dividing ratio outputting the branch signal, an amplifier for amplifying the branch signal output from the limiter, a frequency multiplier for outputting a local oscillation signal having a frequency obtained by multiplying a frequency of the amplified signal by a predetermined multiplicand, a mixer for mixing the local oscillation signal and a signal supplied from an antenna, a band-pass filter for receiving a signal output from the mixer and outputting an intermediate frequency (IF) signal, a detector for producing a detected signal by detecting the IF signal, and a controller connected directly with the output port of the oscillator for performing an operation according to the detected signal based on the oscillation signal as a clock signal. This RF receiver can be inexpensive.

2 Claims, 5 Drawing Sheets

RF RECEIVER

FIELD OF THE INVENTION

The present invention relates to a radio frequency (RF) receiver used for remote control.

BACKGROUND OF THE INVENTION

Vehicles have recently had doors locked, unlocked, opened, and closed via remote control with transmitters held by users from locations away for the vehicles, while also having the doors directly manipulated with mechanical keys. Receivers for receiving radio signals from the transmitters for such remote control are demanded to be inexpensive and to be manipulated reliably.

FIG. 5 is a block diagram of a conventional radio frequency (RF) receiver 20 disclosed in JP2002-218573A. RF receiver 20 includes antenna 1, band-pass filters 2 and 6, amplifiers 3 and 7, mixer 4, detector 8, and local oscillator 9. Antenna 1 is connected with band-pass filer 2. Band-pass filter 2 is connected with amplifier 3. Amplifier 3 is connected with mixer 4. Mixer 4 is connected with band-pass filter 6. Band-pass filter 6 is connected with amplifier 7. Amplifier 7 is connected with detector 8. Local oscillator 9 is connected with frequency multiplier 5. Multiplier 5 is connected with mixer 4.

Antenna 1, band-pass filers 2 and 6, amplifiers 3 and 7, mixer 4, detector 8, frequency multiplier 5, and local oscillator 9 constitute receiving section 15.

Controller 11 is connected with detector 8 and is implemented by a semiconductor device, such as a microcomputer. Oscillator 12 is connected with controller 11 and includes an oscillating element, such as a crystal oscillator. Controller 11 and oscillator 12 constitute control section 16.

RF receiver 20 includes receiving section 15 and control section 16.

RF receiver 20 is installed in a vehicle and connected with an electronic circuit and a battery mounted to the vehicle with connectors and lead wires. Controller 11 is connected with actuator 13 including actuating components, such as motor or solenoid, that actually perform a predetermined operation.

When a user manipulates a transmitter carried by the user who carries a mechanical key and is distanced away from the vehicle, the transmitter transmits a predetermined radio signal containing an identification code and an actuating code.

The radio signal transmitted from the transmitter is received by antenna 1 and supplied to band-pass filter 2. Band-pass filter 2 removes a noise other than a predetermined signal out of the received radio signal and outputs the predetermined signal. The output signal is amplified by amplifier 3 and is supplied to mixer 4.

Local oscillator 9 supplies an oscillation signal to frequency multiplier 5. Frequency multiplier 5 outputs, to mixer 4, a local oscillation signal having a frequency equal to integer multiple of the frequency of the oscillation signal output from local oscillator 9.

Mixer 4 mixes the predetermined signal with the local oscillation signal so as to produce a signal having a frequency equal to the sum of respective frequencies of the predetermined signal and the local oscillation and to produce a signal having a frequency equal to the difference between the frequencies of the predetermined signal and the local oscillation signal. Band-pass filter 6 outputs, as an intermediate frequency (IF) signal. The IF signal is amplified by amplifier 7, and detected by detector 8, thus being output as a detected signal.

The detected signal is supplied to controller 11 that operates based on a clock signal which is an oscillation signal supplied by oscillator 12. Controller 11 determines whether the detected signal is a locking signal or an unlocking signal. When the detected signal is the locking signal or the unlocking signal, controller 11 sends a control signal to actuator 13 so as to control actuator 13 to lock or unlock doors of the vehicle.

That is, the user can directly lock, unlock, open, and close the doors with the mechanical key while approaching the vehicle, and further, can lock, unlock, open, and close the doors remotely with the transmitter carried by the user from location distanced from the vehicle.

Receiving section 15 includes local oscillator 9 and oscillator 12 separate from each other. For example, if oscillator 12 is connected to frequency multiplier 5 and controller 11 simply with wiring, the signals supplied to frequency multiplier 5 and controller 11 can have too small amplitudes to allow controller 11 to operate, hence preventing the doors of the vehicle from being locked and unlocked.

In order to avoid such situation, amplifiers for amplifying the oscillation signal from oscillator 12 may be provided between controller 11 and oscillator 12 and between frequency multiplier 5 and oscillator 12. In this case, these amplifiers connected with oscillator 12 affects oscillator 12, and may stop oscillation of oscillator 12 including a crystal oscillator.

The oscillation frequencies of oscillators 9 and 12 are generally different from each other, thus preventing the oscillators from replaced as a single common oscillator and increasing cost.

SUMMARY OF THE INVENTION

A radio frequency (RF) receiver includes an antenna for receiving a signal, an oscillator for outputting an oscillation signal from an output port thereof, a limiter for dividing the oscillation signal output from the oscillator into a branch signal at a predetermined dividing ration and outputting the branch signal, an amplifier for amplifying the branch signal output from the limiter, a frequency multiplier for outputting a local oscillation signal having a frequency obtained by multiplying a frequency of the amplified branch signal by a predetermined multiplicand, a mixer for mixing the local oscillation signal and a signal supplied from the antenna, a band-pass filter for receiving a signal output from the mixer and outputting an intermediate frequency (IF) signal, a detector for producing a detected signal by detecting the IF signal, and a controller connected directly with the output port of the oscillator for performing an operation according to the detected signal based on the oscillation signal as a clock signal.

This RF receiver can be inexpensive.

DETAILED DESCRIPTION OF PREFERRED EMBODIMENT

Figure 1A:
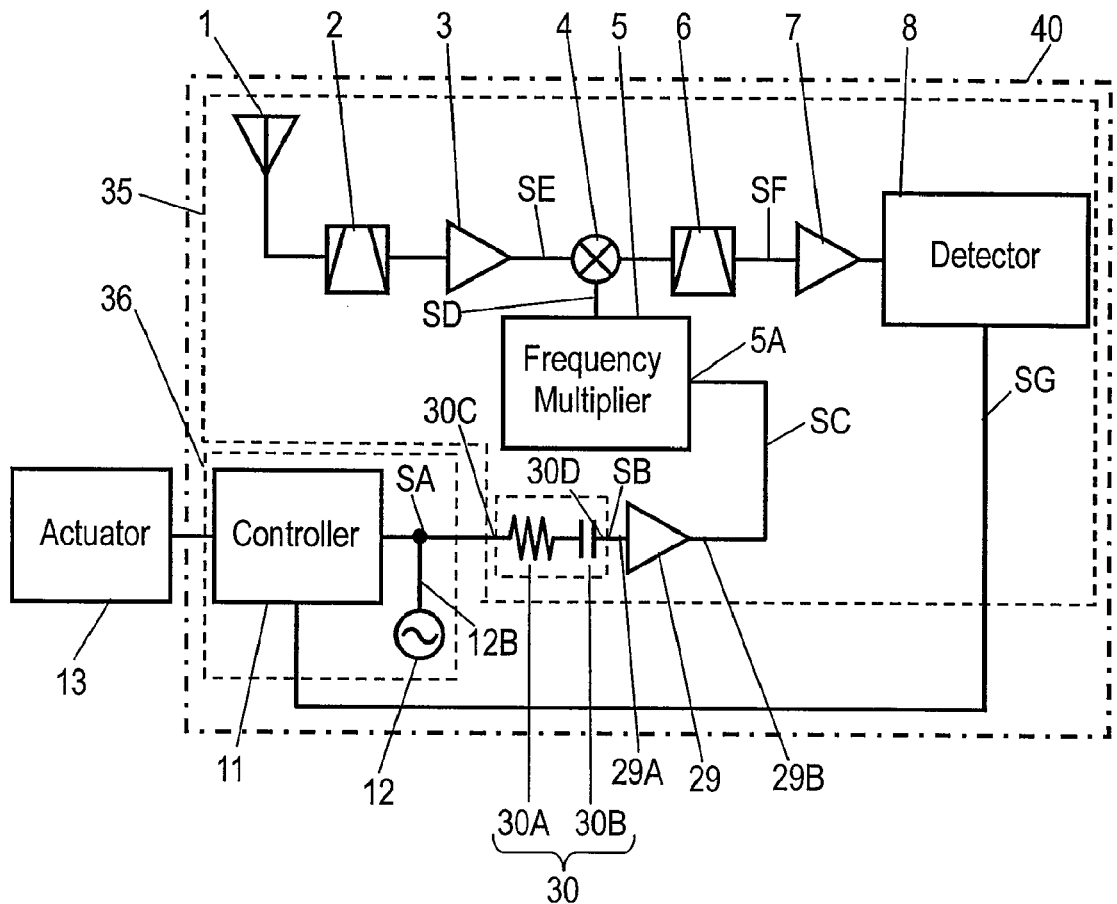
FIG. 1A is a block diagram of a radio frequency (RF) receiver according to an exemplary embodiment of the present invention.

FIG. 1A is a block diagram of radio frequency (RF) receiver 40 in accordance with an exemplary embodiment of the present invention. RF receiver 20 includes antenna 1, band-pass filters 2 and 6, amplifiers 3 and 7, mixer 4, detector 8, oscillator 12, and frequency multiplier 5. Antenna 1 is made of a conductive metal wire.

RF receiver 40 further includes amplifier 29 and limiter 30. Limiter 30 has resistor 30A and capacitor 30B connected in series with each other.

Antenna 1 is connected with band-pass filter 2. Band-pass filter 2 is connected with amplifier 3. Amplifier 3 is connected with mixer 4. Mixer 4 is connected with band-pass filter 6. Band-pass filter 6 is connected with amplifier 7. Amplifier 7 is connected with detector 8. Limiter 30 is connected with amplifier 29. Amplifier 29 is connected with frequency multiplier 5. Frequency multiplier 5 is connected with mixer 4.

Antenna 1, band-pass filters 2 and 6, amplifiers 3 and 7, 29, mixer 4, detector 8, frequency multiplier 5, and limiter 30 constitute receiving section 35. Oscillator 12 is connected with input port 30C of limiter 30 and outputs oscillation signal SA from output port 12B to receiving section 35.

Controller 11 is connected with detector 8 and implemented by a semiconductor device, such as a microcomputer. Oscillator 12 is connected with controller 11 and generates an oscillation signal based on oscillation of an oscillating element, such as a crystal oscillator. Controller 11 and oscillator 12 constitute control section 36

RF receiver 40 includes receiving section 35 and control section 36.

Figure 1B:
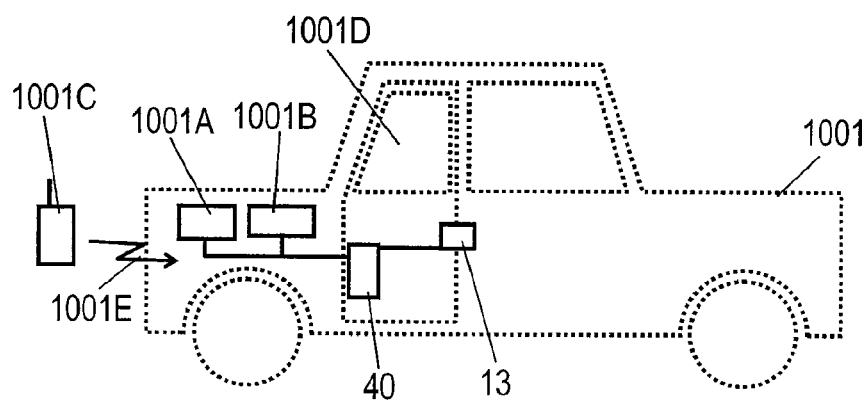
FIG. 1B is a schematic diagram of a vehicle having the RF receiver mounted thereto according to the embodiment.

FIG. 1B is a schematic diagram of vehicle 1001 to which RF receiver 40 is arranged to be mounted.

RF receiver 40 is mounted to vehicle 1001 and connected via connectors and lead wires with electronic circuit 1001B and battery 1001A that are mounted to the vehicle. Controller 11 is connected with actuator 13 including actuating elements, such as a motor or a solenoid, that actually perform a predetermined operation.

When a user manipulates transmitter 1001C carried by the user who carries a mechanical key and is distanced away from vehicle 1001, transmitter 1001C transmits a predetermined RF signal 1001E containing an identification code and an actuating code.

The radio signal transmitted from transmitter 1001C is received by antenna 1 and supplied to band-pass filter 2. Band-pass filter 2 removes noise in the received signal other than a predetermined signal having a predetermined frequency, and outputs the predetermined signal. The output signal is amplified by amplifier 3 and supplied to mixer 4.

Limiter 30 predetermines a dividing ratio of branch signal SB supplied to amplifier 29 out of oscillation signal SA to a signal supplied to controller 11. Limiter 30 divides signal SA into branch signal SB at the determined ratio and supplies branch signal SB to amplifier 29 according to the ratio determined by limiter 30. Amplifier 29 amplifies the signal supplied from limiter 30 and supplies the amplified signal to frequency multiplier 5. Frequency multiplier 5 outputs a local oscillation signal to mixer 4. The local oscillation signal has a frequency provided by multiplying the frequency of the signal output from amplifier 29 by a predetermined multiplicand.

Mixer 4 mixes the predetermined signal with the local oscillation signal to produce a signal having a frequency equal to the sum of respective frequencies of the predetermined signal and the local oscillation signal and a signal having a frequency equal to the difference between the frequencies of the predetermined signal and the local oscillation signal. Band-pass filter 6 outputs, as an intermediate frequency (IF) signal only the signal having the frequency equal to the difference out of the signals produced by mixer 4. The IF signal is amplified by amplifier 7 and is then detected by detector 8 to be a detected signal.

The detected signal is supplied to controller 11 that operates based on a clock signal, namely, an oscillation signal supplied by oscillator 12. Controller 11 determines whether the detected signal is a locking signal or an unlocking signal. When the detected signal is the locking signal or the unlocking signal, controller 11 sends a control signal to actuator 13 to control actuator 13 to lock or unlock door 1001D of vehicle 1001.

That is, the user can directly lock, unlock, open, and close door 1001D with the mechanical key while approaching vehicle 1001, and further, can lock, unlock, open, and close door 1001D remotely with transmitter 1001C carried by the user from location distanced from vehicle 1001.

Figure 2A:
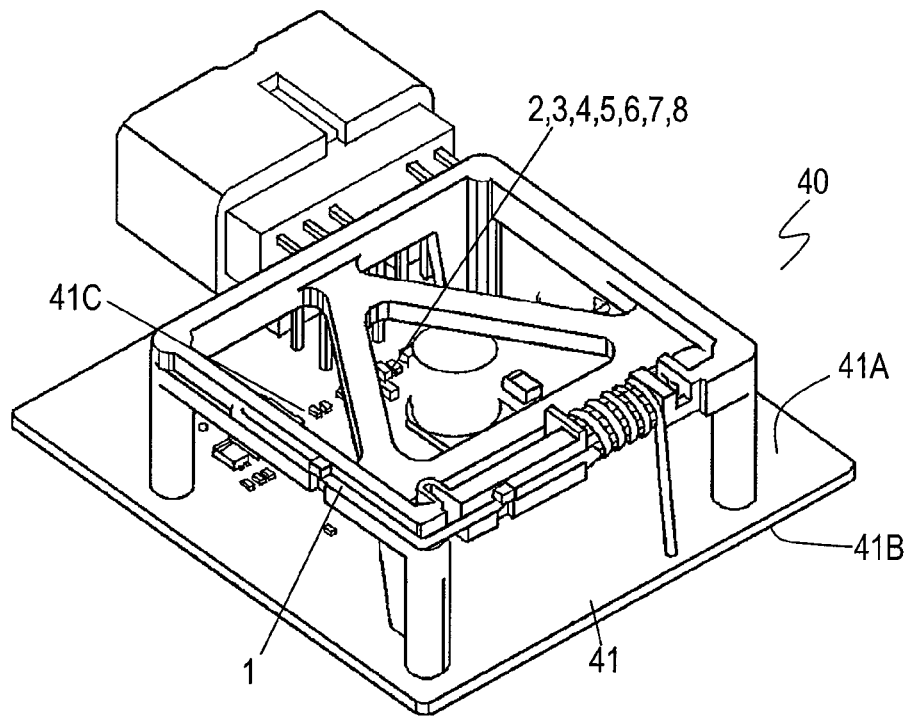
FIGS. 2A and 2B are a top perspective view and a bottom perspective view of the RF receiver according to the embodiment, respectively.
Figure 2B:
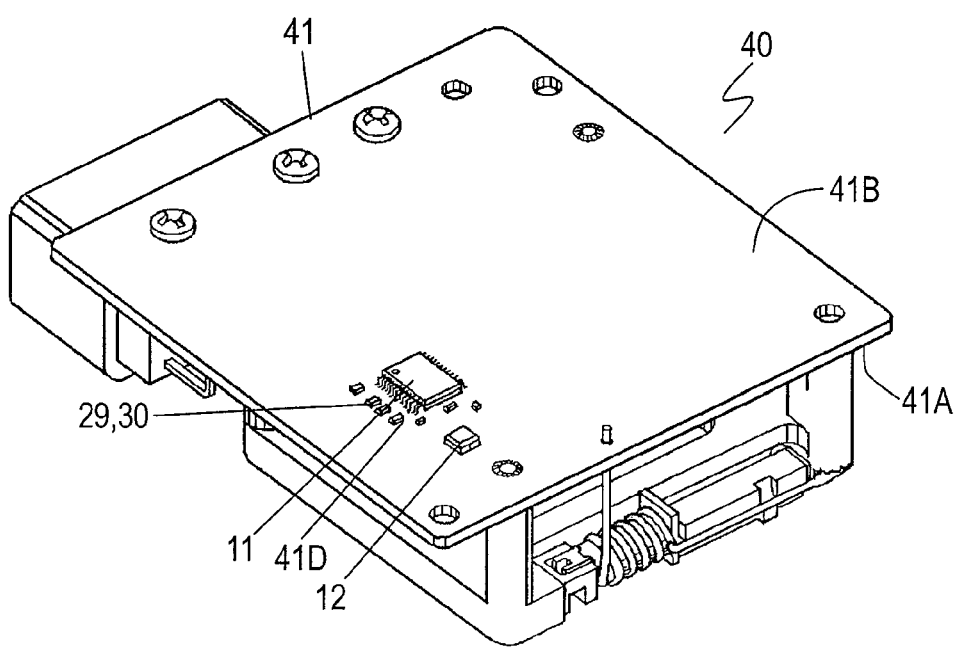

FIGS. 2A and 2B are top and bottom perspective views of RF receiver 20, respectively. As shown in FIG. 2A, antenna 1, band-pass filters 2 and 6, mixer 4, frequency multiplier 5, amplifiers 3 and 7, and detector 8 are provided on upper surface 41A of circuit board 41. Antenna 1, band-pass filters 2 and 6, mixer 4, frequency multiplier 5, amplifiers 3 and 7, and detector 8 provided on upper face 41A of circuit board 41 are connected via wiring 41C provided on upper surface 41A of circuit board 41. As shown in FIG. 2B, controller 11, oscillator 12, amplifier 29, and limiter 30 are provided on lower surface 41B of circuit board 41 opposite to upper surface 41A. Controller 11, oscillator 12, amplifier 29, and limiter 30 are connected via wiring 41D provided on lower surface 41B of circuit board 41.

Frequency multiplier 5 multiplies the frequency of the oscillation signal generated by oscillator 12 by an integer. The oscillation signal transmits via wiring 41D on lower surface 41B of circuit board 41. The local oscillation signal having the frequency which is an integral multiple produced by frequency multiplier 5 transmits via wiring 41C on upper surface 41A of circuit board 41 having mixer 4 is mounted thereon. This arrangement prevents the signals input to antenna 1 and mixer 4 from having the local oscillation signal as a high-frequency noise, thus allowing door 1001D to be locked and unlocked stably.

Figure 3A:
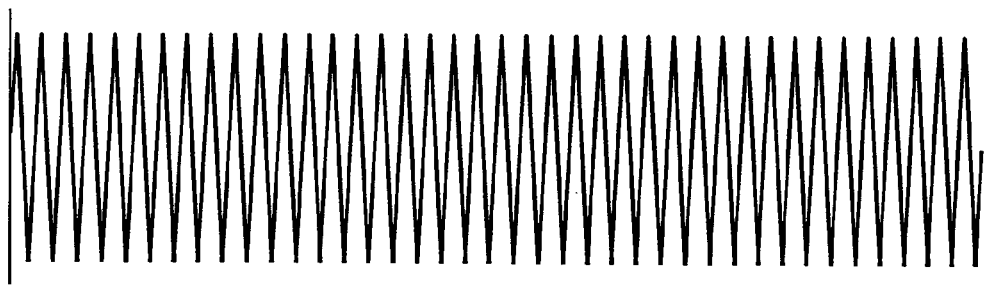
FIGS. 3A to 3D illustrate signals of the RF receiver according to the embodiment.

FIG. 3A illustrates the waveform of oscillation signal SA output from output port 12B of oscillator 12. Oscillation signal SA having a predetermined frequency and is generated by oscillator 12 including an oscillation element, such as a crystal oscillator, and is input to controller 11, thus determining an operating frequency at which controller 11 operates. The frequency of oscillation signal SA is 9.85 MHz according to the embodiment.

Figure 3B:
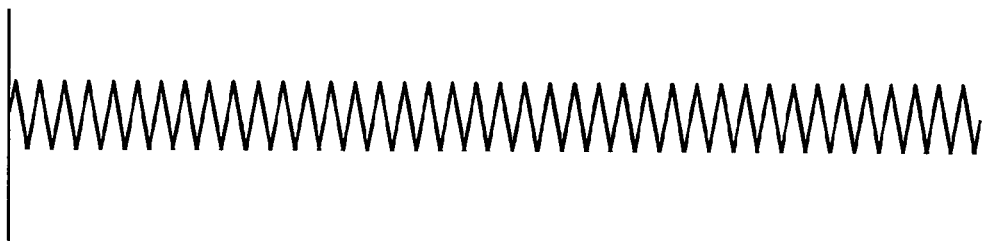

Oscillation signal SA is also supplied to input port 30C of limiter 30 connected to output port 12B of oscillator 12. Limiter 30 has output port 30D. Resistor 30A and capacitor 30B are connected in series with each other between input port 30C and output port 30D. Oscillation signal SA is divided into branch signal SB at the dividing ratio determined by resistor 30A, and limiter 30 outputs branch signal SB from output port 30D. FIG. 3B illustrates the waveform of branch signal SB. Branch signal SB has an amplitude smaller than oscillation signal SA.

Thus, oscillation signal SA from oscillator 12 is divided into controller 11 and amplifier 29. The amplitudes of oscillation signal SA and branch signal SB are in a trade-off situation in which, as the amplitude of branch signal SB increases, the amplitude of oscillation signal SA supplied to controller 11 decreases. Limiter 30 determines the dividing ratio of branch signal SB which is supplied to amplifier 29 out of oscillation signal SA, to the signal supplied to controller 11

In other words, the amplitude of oscillation signal SA can be maintained sufficient to operate controller 11 by resister 30A determining the dividing ratio of oscillation signal SA output from oscillator 12 to limiter 30.

Resistor 30A is connected with input port 30C connected with output port 12B of oscillator 12. Capacitor 30B is connected with output port 30D connected with input port 29A of amplifier 29. Capacitor 30B separates between amplifier 29A and resistor 30A, i.e., between amplifier 12 and oscillator 12 in low frequencies, thereby preventing the crystal oscillator of oscillator 12 from stopping oscillation.

Figure 3C:
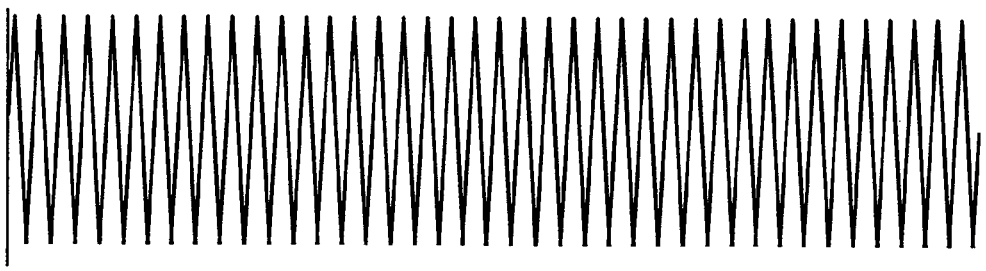

Branch signal SB output from limiter 30 is supplied to amplifier 29 from input port 29A. Amplifier 29 outputs signal SC from output port 29B by amplifying branch signal SB so that the amplitude of branch signal SB reaches a predetermined value. FIG. 3C illustrates the waveform of signal SC. Signal SC in supplied to input port 5A of frequency multiplier 5.

Figure 3D:
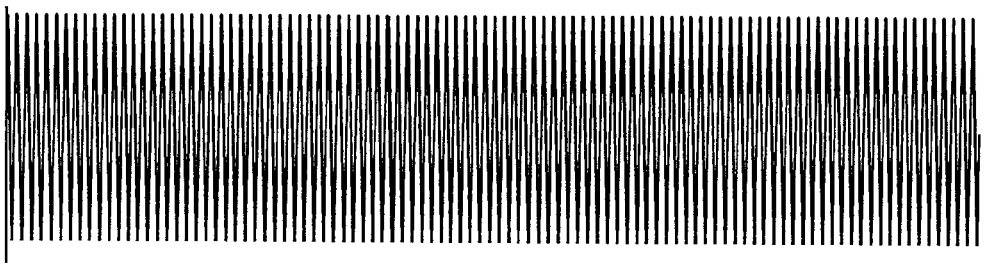

Frequency multiplier 5 produces local oscillation signal SD that has a frequency obtained by multiplying the frequency of inputted signal SC by a predetermined multiplicand. According to the embodiment, the frequency of signal SA is 9.85 MHz. Frequency multiplier 5 outputs local oscillation signal SD having a frequency of 315.2 MHz which is equal to 32 times the frequency of signal SA. FIG. 3D illustrates the waveform of local oscillation signal SD.

Figure 4A:
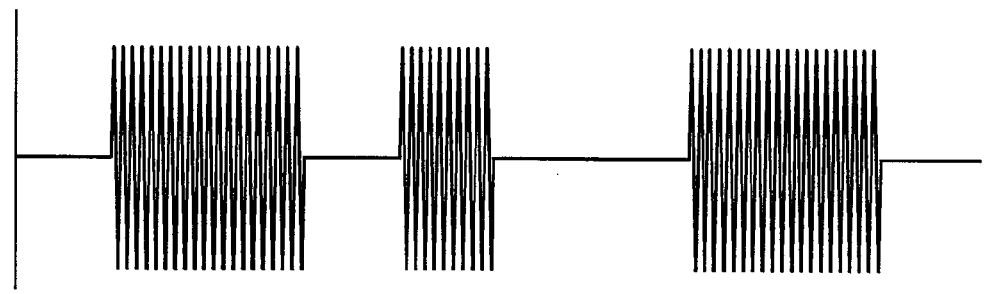
FIGS. 4A to 4C illustrate signals of the RF receiver according to the embodiment.

The RF signal having a frequency of e.g. 315 MHz transmitted by the transmitter and received by antenna 1 is supplied to band-pass filter 2. Band-pass filter 2 removes noises other than a signal having a predetermined frequency and outputs only a predetermined signal. Amplifier 3 amplifies the signal output from band-pass filter 2 and outputs signal SE having a waveform shown in FIG. 4A.

Figure 4B:
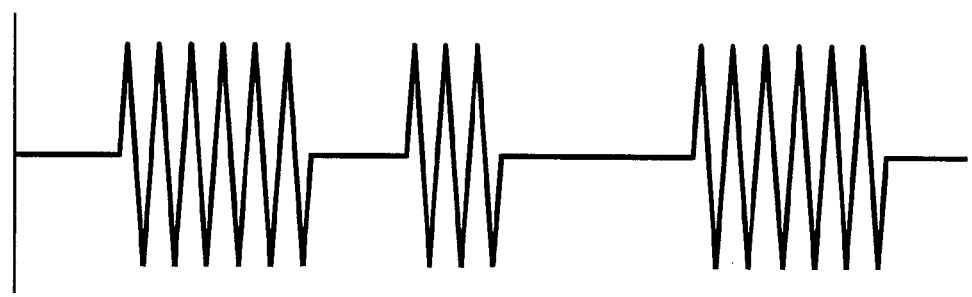

Mixer 4 mixes signal SE with local oscillation signal SD, and outputs a signal having a frequency equal to the sum of frequencies of local oscillation signal SD and signal SE and a signal having a frequency equal to the difference of the frequencies of signals SD and SE. Band-pass filter 6 outputs intermediate frequency 'IF) signal SF having an intermediate frequency equal to the difference between the frequency of local oscillation signal SD and the frequency of signal SE out of signals SD and SE. FIG. 4B illustrates the waveform of IF signal SF. According to the embodiment, the frequency of local oscillation signal SD is 315.2 MHz while the frequency of signal SE is 315 MHz. The frequency of IF signal SF is 0.2 MHz which is the difference between these frequencies.

Figure 4C:
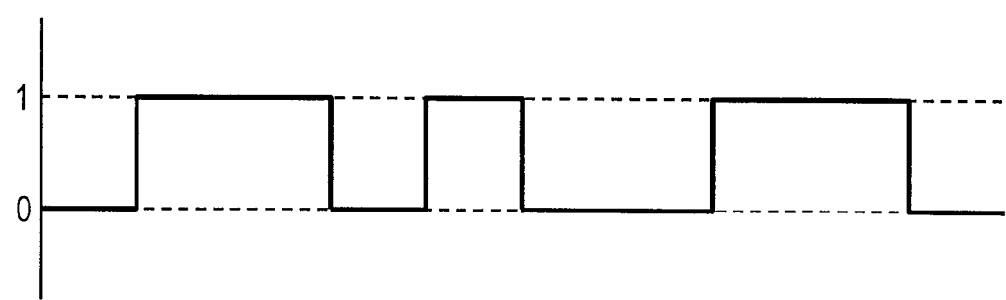
Figure 5:
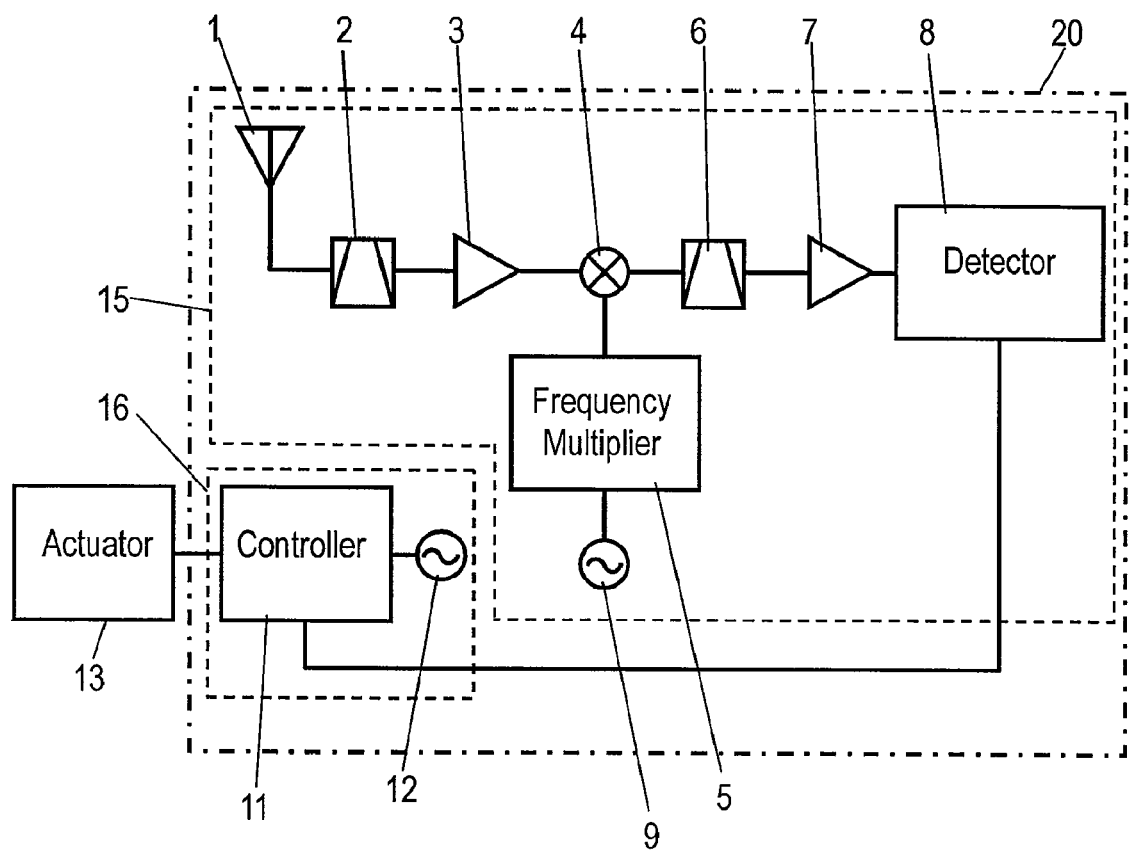
FIG. 5 is a block diagram of a conventional RF receiver.

IF signal SF is amplified by amplifier 7. Detector 8 detects the amplified IF signal to output detected signal SG. FIG. 4C illustrates the waveform of detected signal SG. Detected signal SG is a digital signal having two levels of "0" and "1".

Controller 11 determines whether detected signal SG is a locking signal or an unlocking signal. If detected signal SG is the locking signal, controller 11 controls actuator 13 to lock door 1001D. If detected signal SG is the unlocking signal, controller 11 control actuator 13 to unlock door 1001D. Controller 11 is connected directly with output port 12B of oscillator 12 and performs an operation based on oscillation signal SA as a clock signal according to detected signal SG, namely, locks and unlocks door 1001D.

Output port 12B of oscillator 12 is connected directly with controller 11 while being coupled with mixer 4 via limiter 30, amplifier 29, and frequency multiplier 5 of receiving section 35. Controller 11 intermittently supplies power to receiving section 15 while receiving section 15 waits for RF signal 1001E. This operation reduces the power consumed by receiving section 15, thus saving power consumption of receiver 40.

In RF receiver 40 in accordance with the embodiment, oscillator 12 functions as a clock signal generator for determining the operating frequency of controller 11 as well as a local oscillator for generating local oscillation signal SD of receiving section 35, hence allowing RF receiver 40 to be inexpensive.

According to the embodiment, terms, such as "upper surface" and "lower surface", indicating directions indicates relative directions depending on relative locations of constructional components, such as antenna 1, frequency multiplier 5, mixer 4, band-pass filter 6, detector 8, controller 11, oscillator 12, limiter 30, and circuit board 41 of RF receiver 40, and do not indicate absolute directions, such as a vertical direction.

What is claimed is:

1. A radio frequency (RF) wave receiver comprising:
   an oscillator for generating and outputting an oscillation signal from an output port thereof;
   a limiter for dividing the oscillation signal output from the oscillator into a branch signal at a predetermined dividing ratio and outputting the branch signal;
   an amplifier for amplifying the branch signal output from the limiter;
   a frequency multiplier for outputting a local oscillation signal having a frequency obtained by multiplying a frequency of the amplified branch signal by a predetermined multiplicand;
   a mixer for mixing the local oscillation signal and a signal supplied from an antenna;
   a band-pass filter for receiving a signal output from the mixer and outputting an intermediate frequency (IF) signal;
   a detector for producing a detected signal by detecting the IF signal; and
   a controller connected directly with the output port of the oscillator for performing an operation according to the detected signal based on the oscillation signal as a clock signal.

2. The RF receiver of claim 1, further comprising a circuit board having an upper surface and a lower surface, the upper surface of the circuit board having the antenna, the frequency multiplier, the mixer, the band-pass filter, and the detector mounted thereon, the lower surface of the circuit board having the controller, the oscillator, and the limiter mounted thereon.

* * * * *